(12) United States Patent
Chen

(10) Patent No.: US 7,510,318 B2
(45) Date of Patent: Mar. 31, 2009

(54) FASTENING APPARATUS FOR A BACKLIGHT ASSEMBLY

(75) Inventor: Po-Chun Chen, Taipei County (TW)

(73) Assignee: HannStar Display Corp., Yang-Mei, Tao-Yuan Hsien (TW)

( * ) Notice: Subject to any disclaimer, the term of this patent is extended or adjusted under 35 U.S.C. 154(b) by 122 days.

(21) Appl. No.: 11/685,190

(22) Filed: Mar. 12, 2007

(65) Prior Publication Data

US 2008/0225556 A1   Sep. 18, 2008

(51) Int. Cl.
*F21V 7/04* (2006.01)
(52) U.S. Cl. .................. 362/634; 362/632; 362/633; 362/97
(58) Field of Classification Search .............. 362/29, 362/30, 327, 561, 632, 633, 634; 248/220.43
See application file for complete search history.

(56) References Cited

U.S. PATENT DOCUMENTS

| | | | | |
|---|---|---|---|---|
| 3,319,917 | A * | 5/1967 | Bilodeau | ............... 248/220.43 |
| 3,870,350 | A * | 3/1975 | Loncaric | .................. 285/288.8 |
| 6,722,773 | B2 | 4/2004 | Tsai et al. | |
| 6,902,300 | B2 | 6/2005 | Lee | |
| 7,131,750 | B2 * | 11/2006 | Liu et al. | ..................... 362/327 |
| 2005/0073858 | A1 | 4/2005 | Kim et al. | |
| 2005/0146898 | A1 | 7/2005 | Wu et al. | |
| 2005/0162868 | A1 | 7/2005 | Kim | |
| 2005/0225992 | A1 | 10/2005 | Idei et al. | |
| 2005/0281037 | A1 | 12/2005 | Murakami et al. | |
| 2006/0018130 | A1 | 1/2006 | Lee | |
| 2006/0034090 | A1 | 2/2006 | Chen et al. | |
| 2006/0158905 | A1 | 7/2006 | Lai et al. | |
| 2006/0187665 | A1 | 8/2006 | Shen et al. | |
| 2006/0203480 | A1 | 9/2006 | Choi | |

* cited by examiner

*Primary Examiner*—Sandra L O'Shea
*Assistant Examiner*—James W Cranson
(74) *Attorney, Agent, or Firm*—Winston Hsu

(57) ABSTRACT

The fastening apparatus utilizes a hanger and a hook disposed on the first side of a base of the fastening apparatus for hanging and fixing the fastening apparatus on a back cover of the LCD device. A groove divides the base into two parts and the outer part of the base as well as the hook is flexible relative to the inner part of the base. Two crack arresters are disposed at the end of the groove for preventing cracking of the fastening apparatus when repeated bending movement is needed while installing the fastening apparatus.

18 Claims, 20 Drawing Sheets

FASTENING APPARATUS FOR A BACKLIGHT ASSEMBLY

BACKGROUND OF THE INVENTION

1. Field of the Invention

The present invention relates to a fastening apparatus, and more specifically, to a fastening apparatus for a backlight assembly.

2. Description of the Prior Art

In the modern application of liquid crystal display (LCD) devices, the direct type backlight assemblies are typically used in large sized LCDs, which are capable of providing more even light illumination.

Since the lamps are directly disposed under the LCD panel and a diffusing plate for uniforming the light radiated by the lamps is disposed above the lamps by a certain distance, the diffusing plate is highly likely to sag and/or deform if it is not supported well. To prevent the diffusing plate from sagging and/or deforming toward the lamps and the back cover due to its large size, a generic direct type backlight assembly utilizes a plurality of supporters disposed between the back cover and the diffusing plate, in which each of the supporters comprises a spacer pin for sustaining the diffusing plate from sagging and/or deforming and a lamp holder for stabilizing the lamps. There are several types of supporters disclosed according to the prior art. A first type supporter utilizes hooks to snap into the back cover for fixing the supporter on the back cover. FIG. 1 shows an exemplary embodiment of the first type supporter 1. The supporter 1 comprises a spacer pin 12, a base 11, and a hook 13. The spacer pin 12 sustains the diffusing plate and when the hook 13 snaps into the back cover, the base 11 and the hook 13 can tightly fix the supporter 1 on the back cover. A second type supporter 2 utilizes a fixing element 21 (such as a screw or a bolt) or a connecting part for passing through an opening in the back cover 22 for fixing the supporter 2 as shown in FIG. 2. In FIG. 3, a third type supporter 3 has a twin adhesive tape 31 on the bottom of the supporter 3 for adhering the supporter 3 to the back cover 32. In FIG. 4, a fourth type supporter 4 comprises a rotatable pin 41 at the bottom of the supporter 4. When the rotatable pin 41 engages through a hole 42 having a similar shape with the rotatable pin 41 and rotates in a certain angle, the supporter 4 fixes on the back cover. In FIG. 5, a fifth type supporter 5 utilizes simply a hanger 51 that hangs the supporter 5 on the back cover 52 since the backlight assembly, which is part of the LCD device, is generally placed vertically.

However, each type of the supporters aforementioned has its drawback. For the first type supporter 1, the manufacturing of the hook 13 is a challenge since the dimension of the hook 13 is very likely to deviate from its designed dimension during manufacturing. The second type supporter 2, which is fixed on the back cover 22 with an additional fixing element 21, takes more cost and more effort for assembly. Although the twin adhesive 31 can effectively fix the supporter 3 on the back cover 32, the reflective sheet in the backlight assembly that applies the third type supporter 3 is more likely to damage when reinstalling or adjusting the supporter 3. Finally, the fourth type and the fifth type supporters 4,5 are easy for installing but the supporters 4,5 are possible to detach from the back cover on every movement of the backlight assembly.

SUMMARY OF THE INVENTION

The claimed invention provides a fastening apparatus for a backlight assembly. The fastening apparatus comprises a base having a first side, a hanger disposed on the first side of the base, and a hook disposed on the first side of the base.

The claimed invention also provides a liquid crystal display (LCD) device. The LCD device comprises a back cover, a reflective sheet disposed on the back cover, a light source disposed on the reflective sheet, a diffusing plate disposed on the light source, and a fastening apparatus disposed between the back cover and the diffusing plate and engaged with the back cover. The fastening apparatus comprises a base having a first side, a hanger disposed on the first side of the base, and a hook disposed on the first side of the base.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
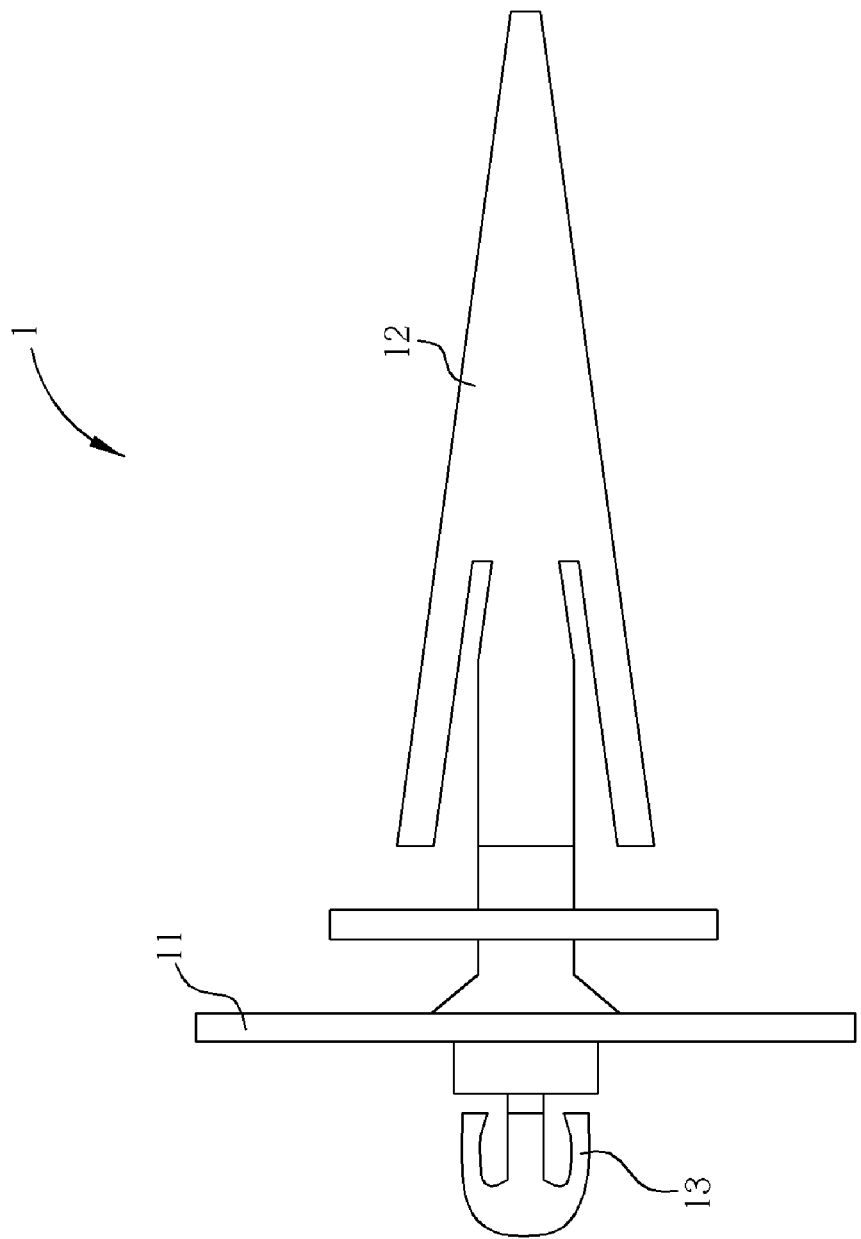
FIG. 1 is an illustration of an exemplary embodiment of the first type supporter according to the prior art.
Figure 2:
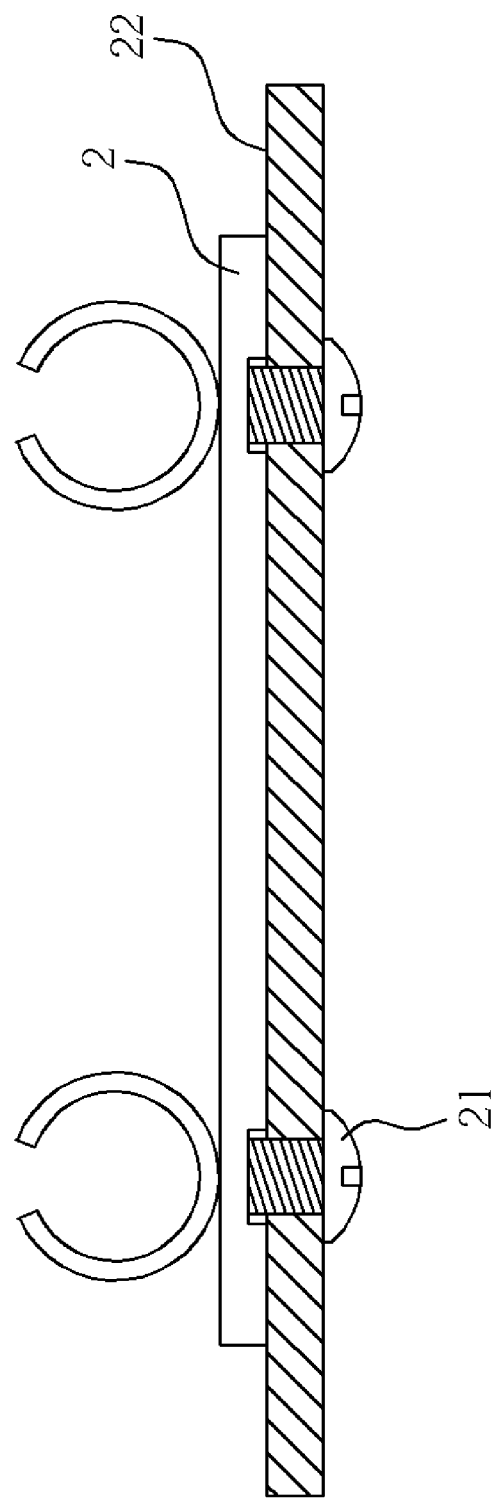
FIG. 2 is an illustration of an exemplary embodiment of the second type supporter according to the prior art.
Figure 3:
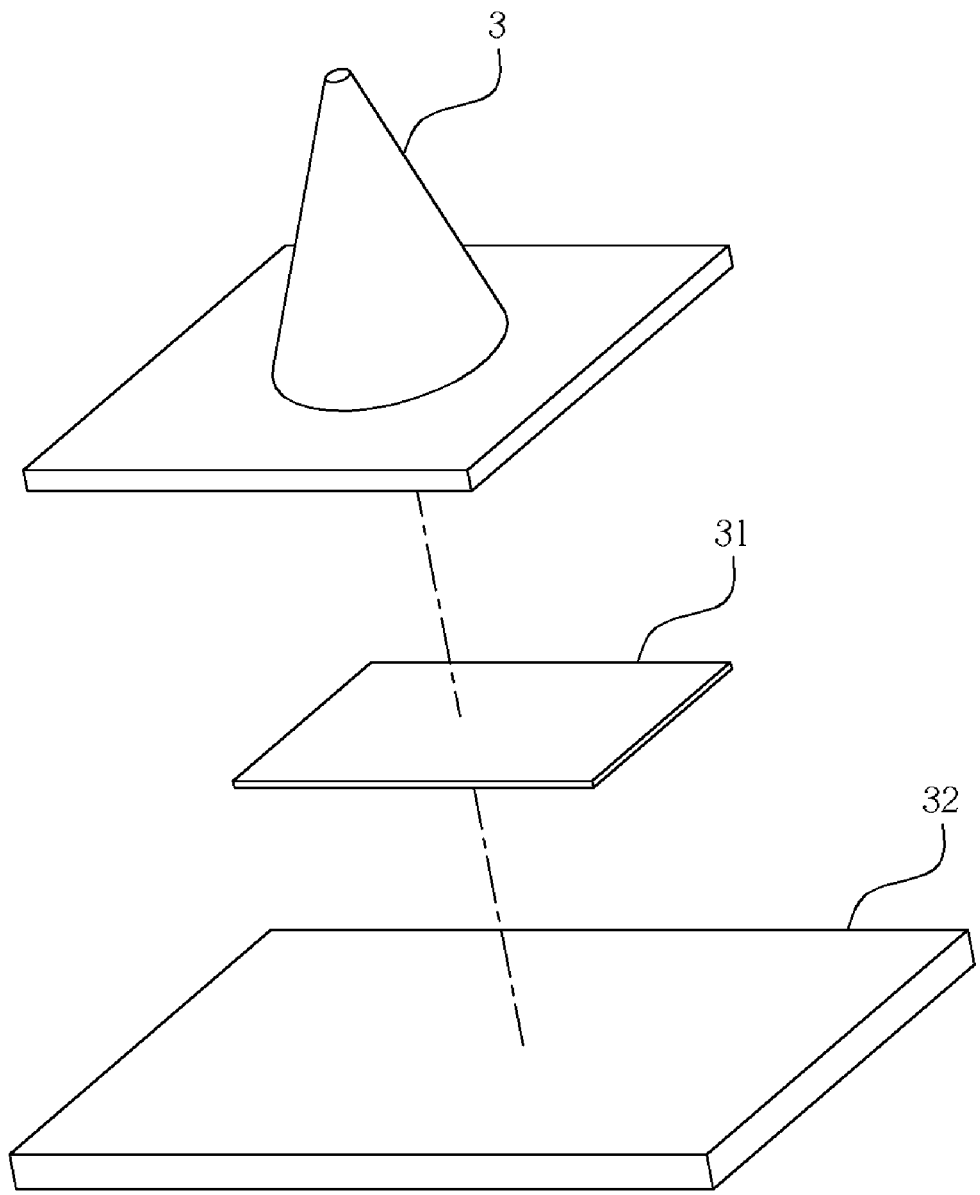
FIG. 3 is an illustration of an exemplary embodiment of the third type supporter according to the prior art.
Figure 4:
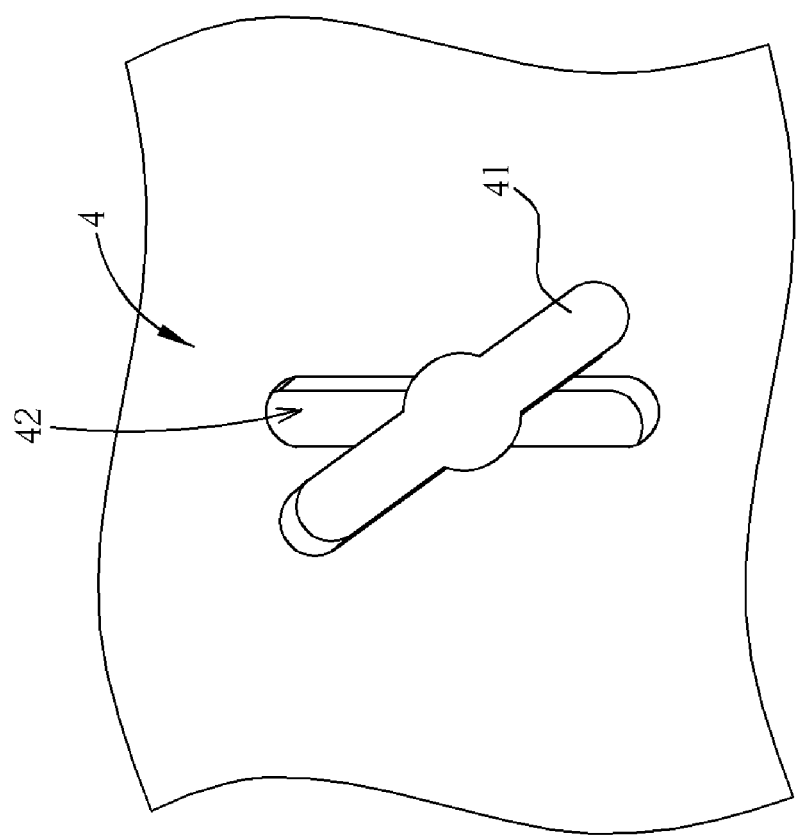
FIG. 4 is an illustration of an exemplary embodiment of a fourth type supporter comprising a rotatable pin at the bottom of the supporter according to the prior art.
Figure 5:
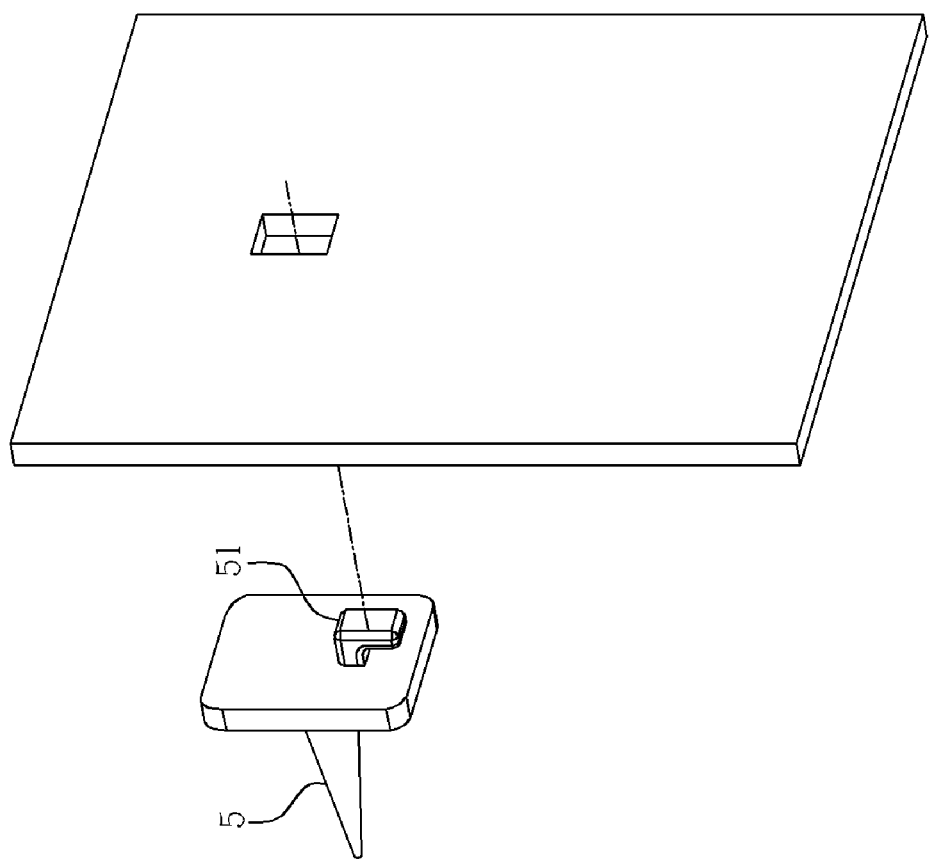
FIG. 5 is an illustration of an exemplary embodiment of the fifth type supporter according to the prior art.
Figure 6:
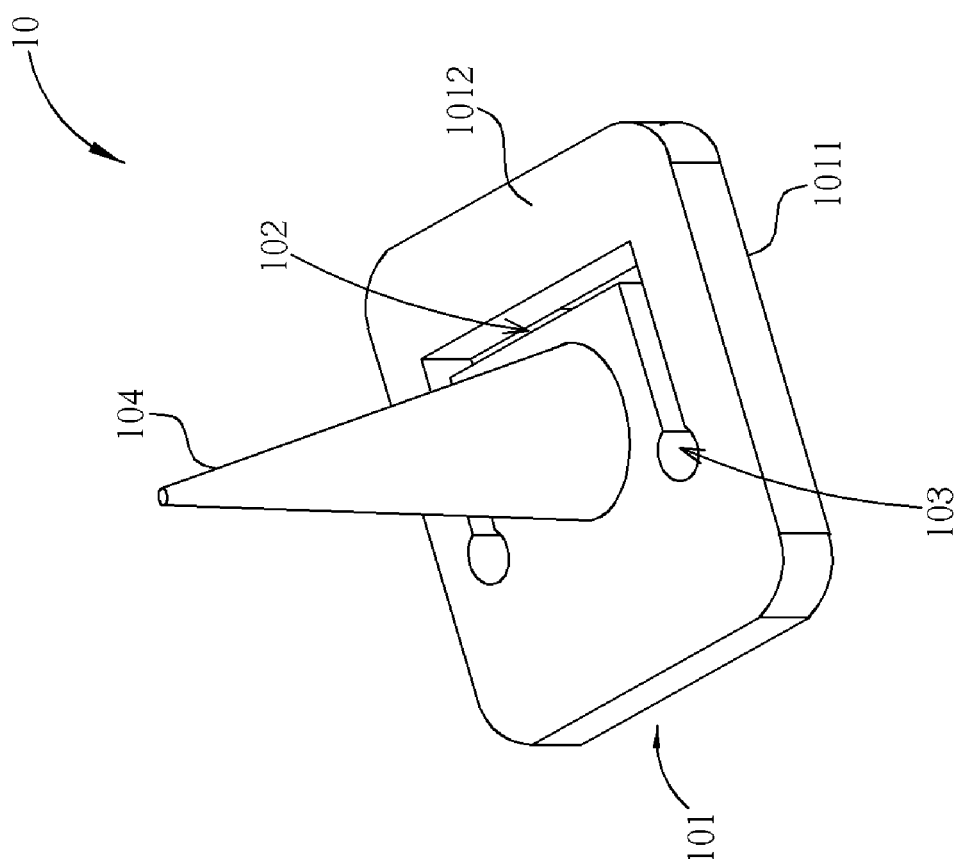
FIG. 6 to FIG. 8 are illustrations of a first exemplary embodiment of the fastening apparatus according to the present invention.
Figure 7:
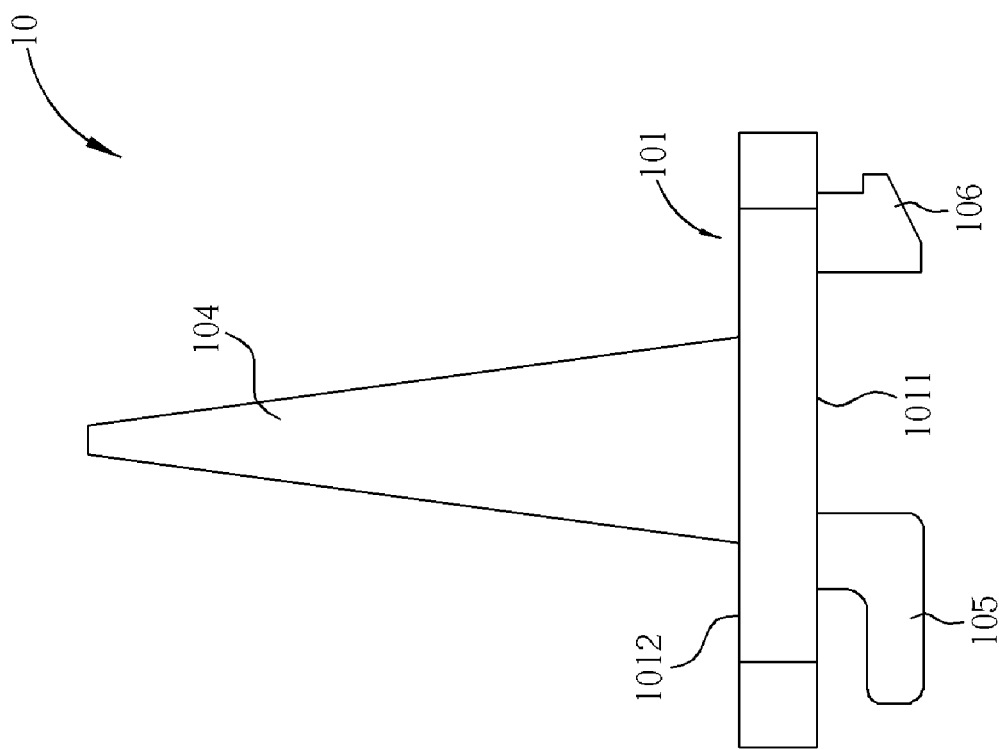
Figure 8:
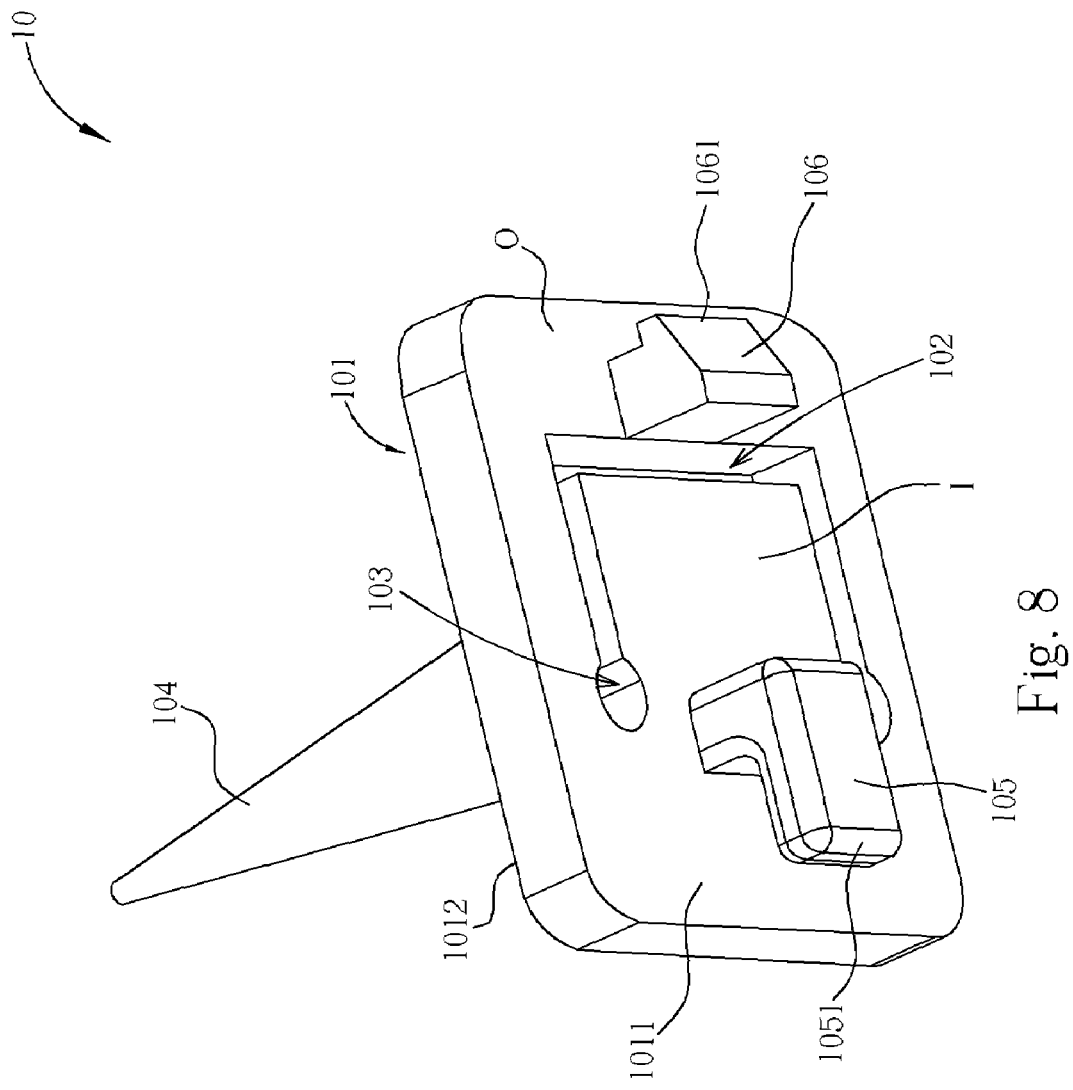

Please refer to FIG. 6 to FIG. 8. FIG. 6 to FIG. 8 illustrate a first exemplary embodiment of the fastening apparatus 10 according to the present invention. The fastening apparatus 10 comprises a base 101, a groove 102, two crack arresters 103, a spacer pin 104, a hanger 105, and a hook 106. In the exemplary embodiment of the present invention, all elements can be monolithically made or not monolithically made to form fastening apparatus 10. In order to obtain a best reflection rate, the fastening apparatus 10 is made of white or transparent polycarbonate (PC) having light reflection rate greater than 80%. The hanger 105 and the hook 106 extend from a first side 1011 of the base 101 and are capable of fixing the fastening apparatus 10 on a back cover. The spacer pin 104 extends from a second side 1012 of the base 101 and is for sustaining a diffusing plate of a backlight assembly. The implementation of the groove 102 provides the fastening apparatus 10 the flexibility when engaging to the back cover. Please refer to FIG. 8. The groove 102 divides the first side 1011 of the base 101 into an inner part I and an outer part O on which the hanger 105 and the hook 106 are respectively disposed. In the fastening apparatus 10, the groove 102 is penetrative through the base 101 and has a U-shape, M-shape, or C-shape and therefore allows the outer part O of the base 101 along with the hook 106 for being slightly lifted up or pressed down. In the exemplary embodiment in FIG. 6 to FIG. 8, except for the spacer pin 104, a lamp holder (like the lamp holder 207 in FIG. 9) extending from the second side 1012 of the base 101 is also an option.

Figure 9:
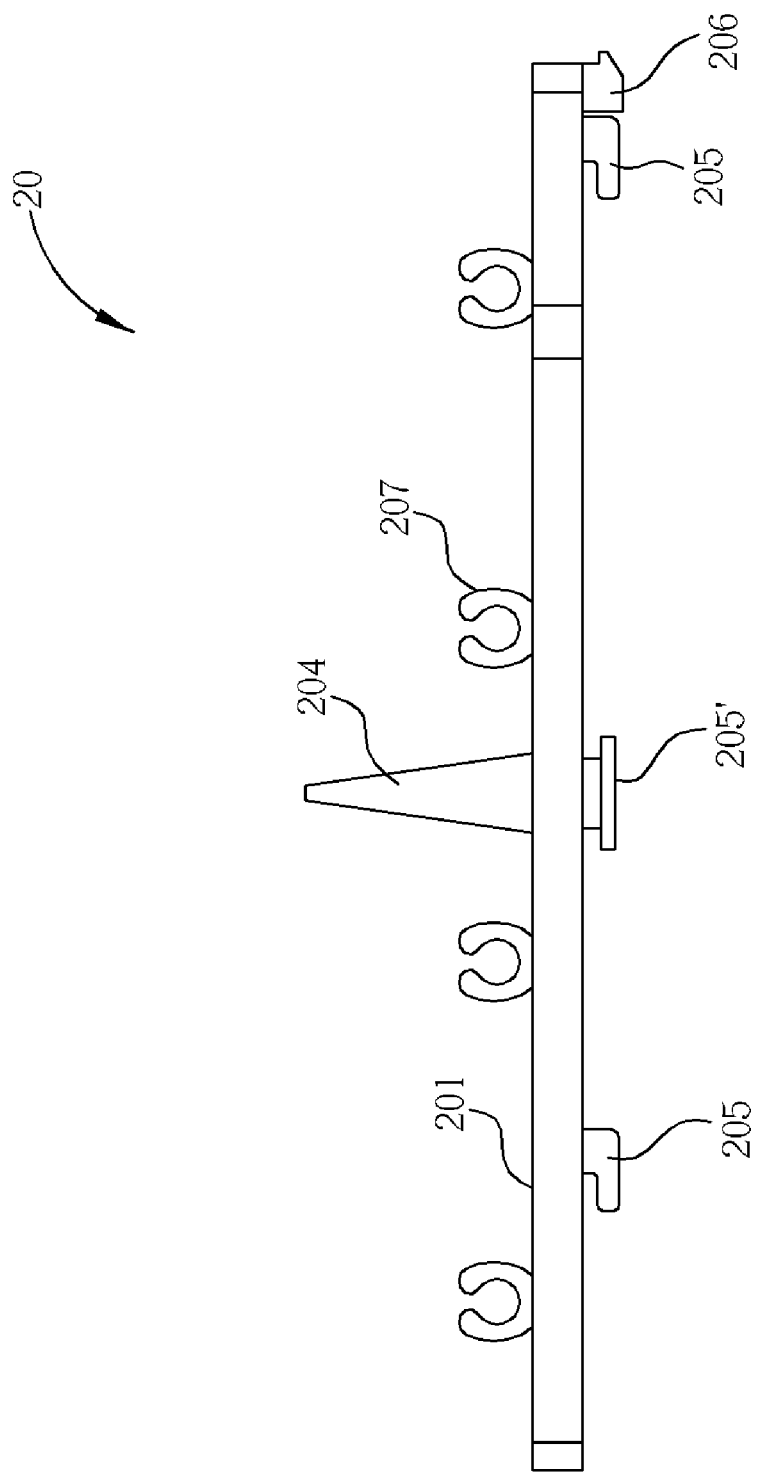
FIG. 9 is an illustration of a second exemplary embodiment of the fastening apparatus according to the present invention.
Figure 10:
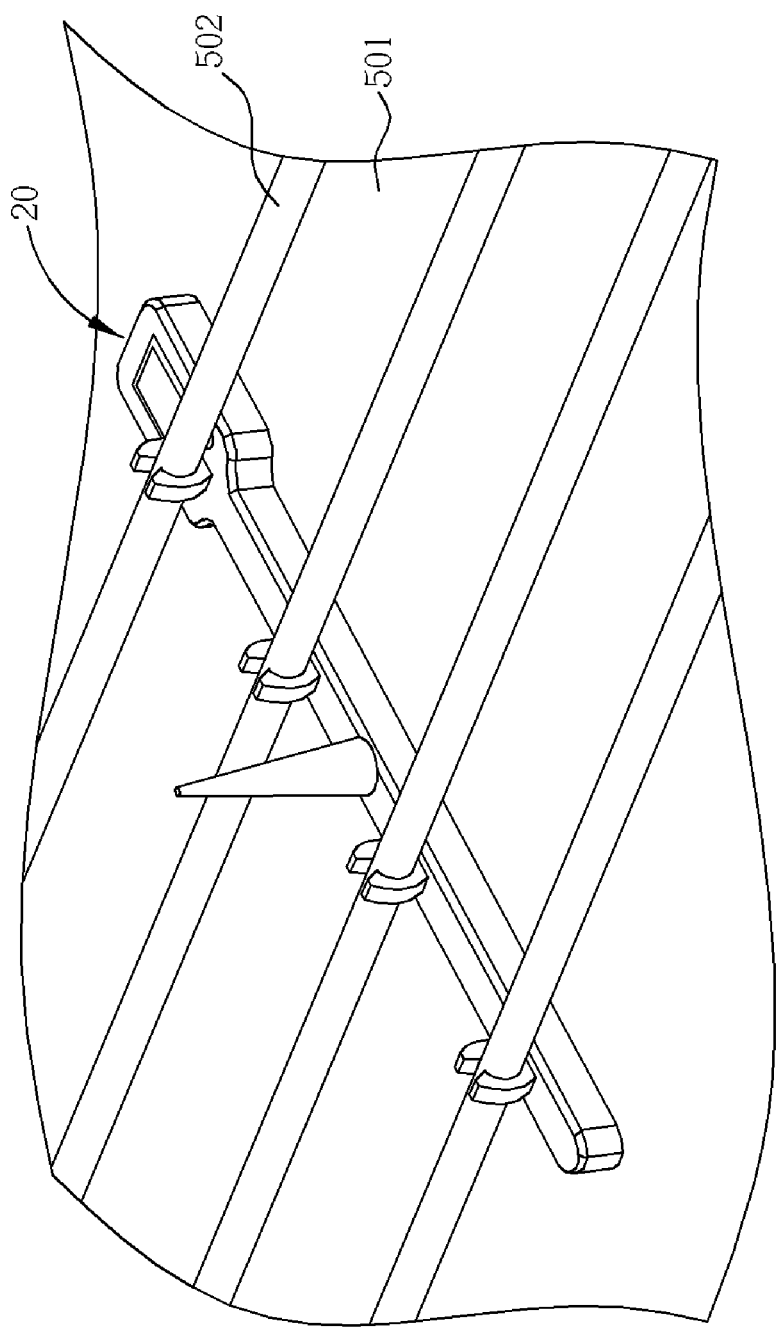
FIG. 10 is an illustration of the fastening apparatus holding a plurality of lamps on the back cover.

Please refer to FIG. 9. FIG. 9 is an illustration of a second exemplary embodiment of the present invention. The fastening apparatus 20 comprises a spacer pin 204 and a plurality of lamp holders 207 on a second side of the base 201, which can further implement for simultaneously sustaining the diffusing plate and holding a plurality of lamps as FIG. 10 shows. The fastening apparatus 20 comprises a hanger 205 like the fastening apparatus 10 does and a hanger 205', an alternation of hanger 205, corresponding to the position of the spacer pin 204, in which the hanger 205' and the spacer pin 204 can either made integrally with the fastening apparatus 20 or a separate part additionally installed on the fastening apparatus 20. The fastening apparatus 20 also comprises the hangers 205, 205' and the hook 206 for fixing in the back cover.

Please refer to FIG. 8 again. In the first exemplary embodiment, the hanger 105 comprises a first protrusion 1051 extended parallel to the base 101 for hanging the fastening apparatus 10 on the back cover. The hook 106 comprises a second protrusion 1061 extended parallel to the base 101 for locking the fastening apparatus 10 on the back cover, preventing the fastening apparatus 10 from detaching from the back cover. Since the first protrusion 1051 is utilized for "hanging" the fastening apparatus 10 on the back cover and the second protrusion 1061 is utilized for fixing the fastening apparatus 10 on the back cover, the length of the first protrusion 1051 is usually not smaller than that of the second protrusion 1061. Additionally, the extending direction of the first protrusion 1051 is opposing to that of the second protrusion 1061 which therefore makes the hook 106 an inverse hook in the exemplary embodiment.

Figure 11:
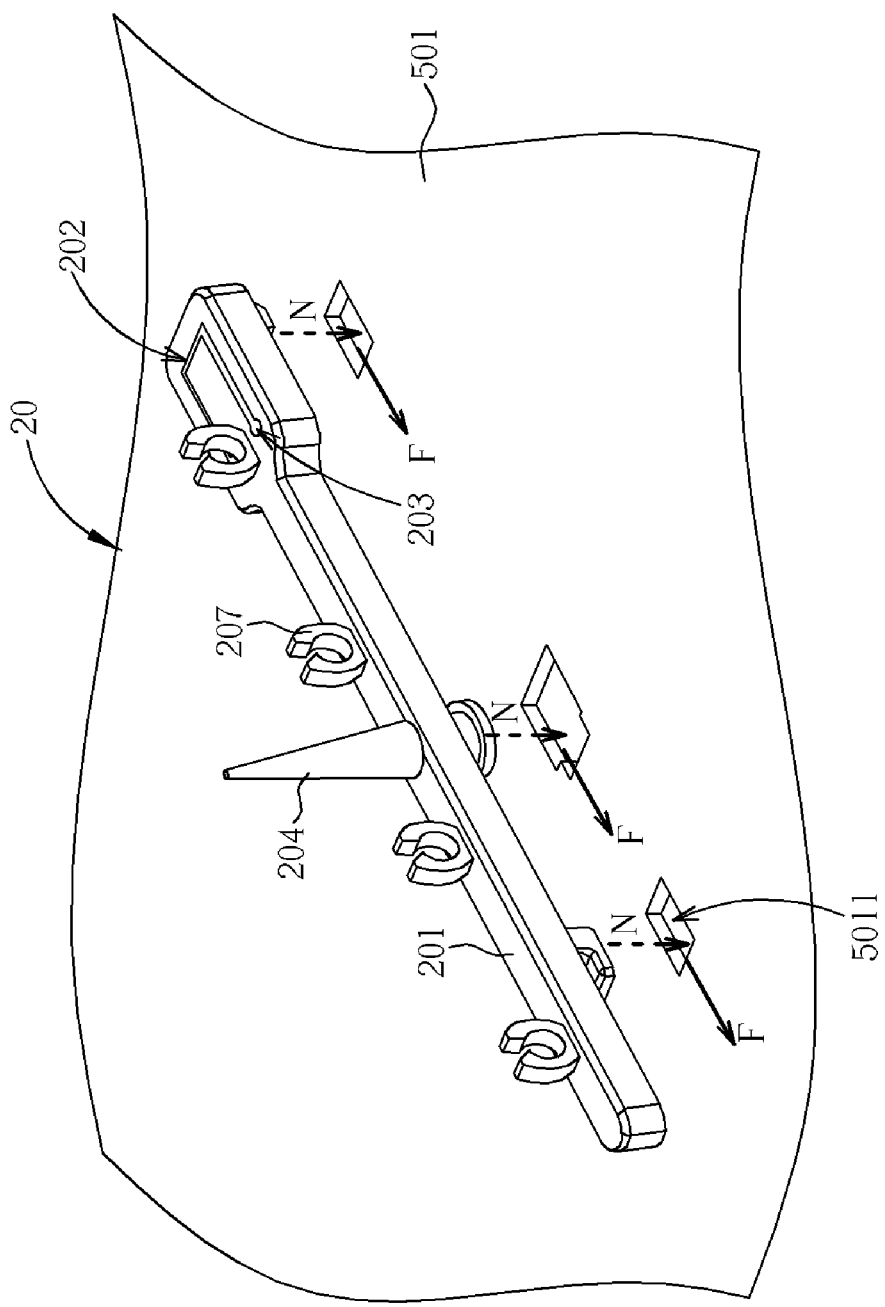
FIG. 11 is an illustration of the fastening apparatus engaging into a back cover according to the present invention.
Figure 12:
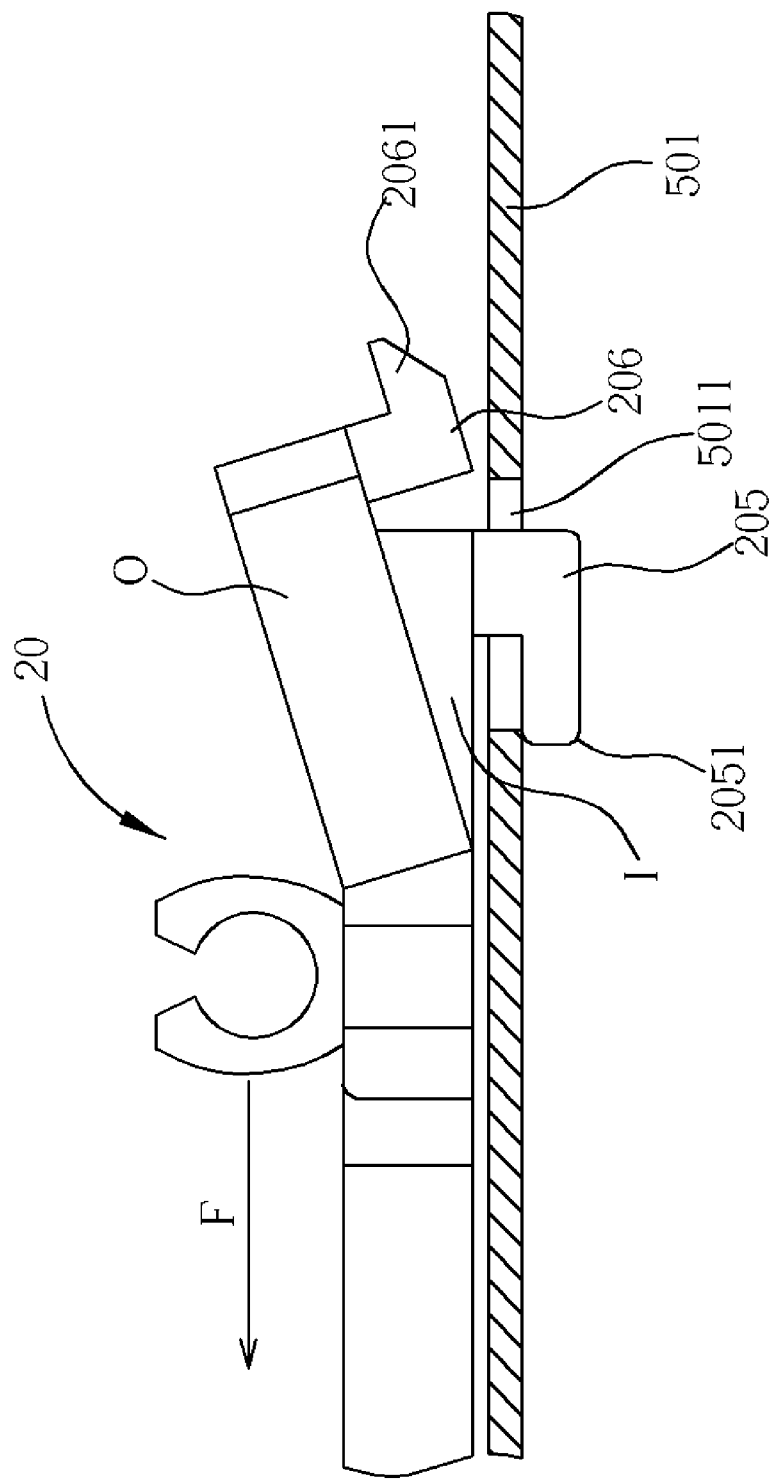
FIG. 12 and FIG. 13 are illustrations of the lateral view of the fastening apparatus hanging into and locking in the back cover.
Figure 13:
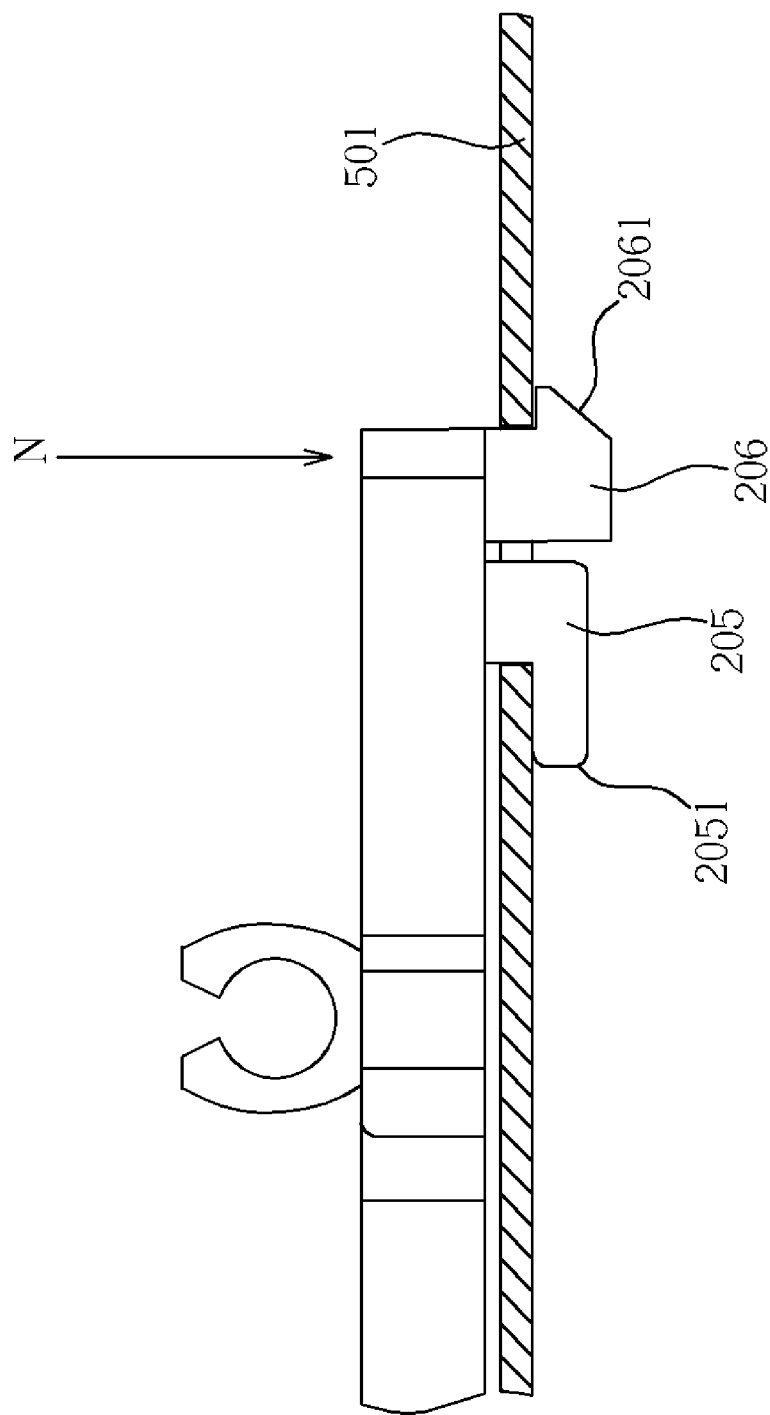
Figure 14:
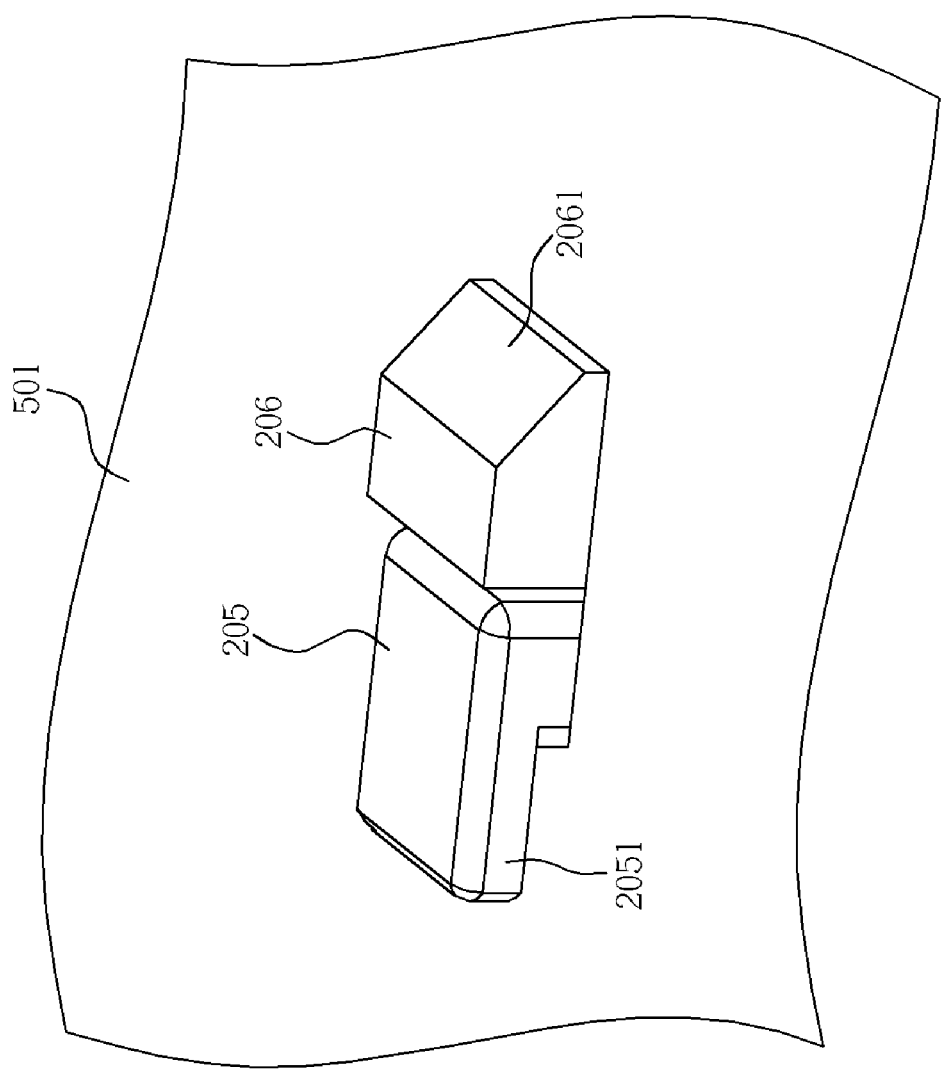
FIG. 14 is an illustration of a bottom perspective view of the fastening apparatus in FIG. 10 engaged into the back cover.

Please refer to FIG. 11 and FIG. 12. The hanger 205 and the hook 206 in the second exemplary embodiment in FIG. 11 have a same feature as the first exemplary embodiment and the following description on the second exemplary embodiment also works on the first exemplary embodiment. The fastening apparatus 20 first inserts to the back cover 501 in the direction N and then the hanger 205 engages to an opening 5011 of the back cover 501 in the direction F. Please refer to FIG. 13 and FIG. 14, which are illustrations of a lateral view of the fastening apparatus 20 hanging into and locking in the back cover 501. Once the hanger 205 and the protrusion 2051 insert to the opening 5011 in the direction N, the outer part O of the base 201 as well as the hook 206 will lift up by the back cover 501 due to the flexibility of the outer part O introduced by the groove 202. The fastening apparatus 20 then engages the hanger 205 to the back cover 501 in the direction F. In FIG. 13, pressing the outer part O in the direction N causes the hook 206 to snap into the opening 5011 and therefore lock the fastening apparatus 20 on the back cover 501. In such way, the fastening apparatus 20 is fully and tightly engaged with the back cover 501 by the hanger 205 and the hook 206. FIG. 14 is an illustration of a bottom perspective view of the fastening apparatus 20 in FIG. 11 engaged into the back cover 501.

Please refer to FIG. 8 and FIG. 11 yet again. For easy installation of the fastening apparatus 10 or 20, the groove 102 or 202 provides bending flexibility to the outer part O of the base 101 or 201. In order to enhance the durability of the fastening apparatus 10 or 20, two circular (or U-shaped, rectangular, or any other possible shape that can stop crack of the groove 102 or 202) crack arresters 103 or 203 are disposed at two ends of the groove 102 or 202 in the exemplary embodiment. The crack arresters 103 or 203 are capable of scattering or releasing stress caused by the bending movement of the outer part O of the base 101 or 201, preventing the fastening apparatus 10 or 20 from cracking when repeated assembly is required.

Figure 15:
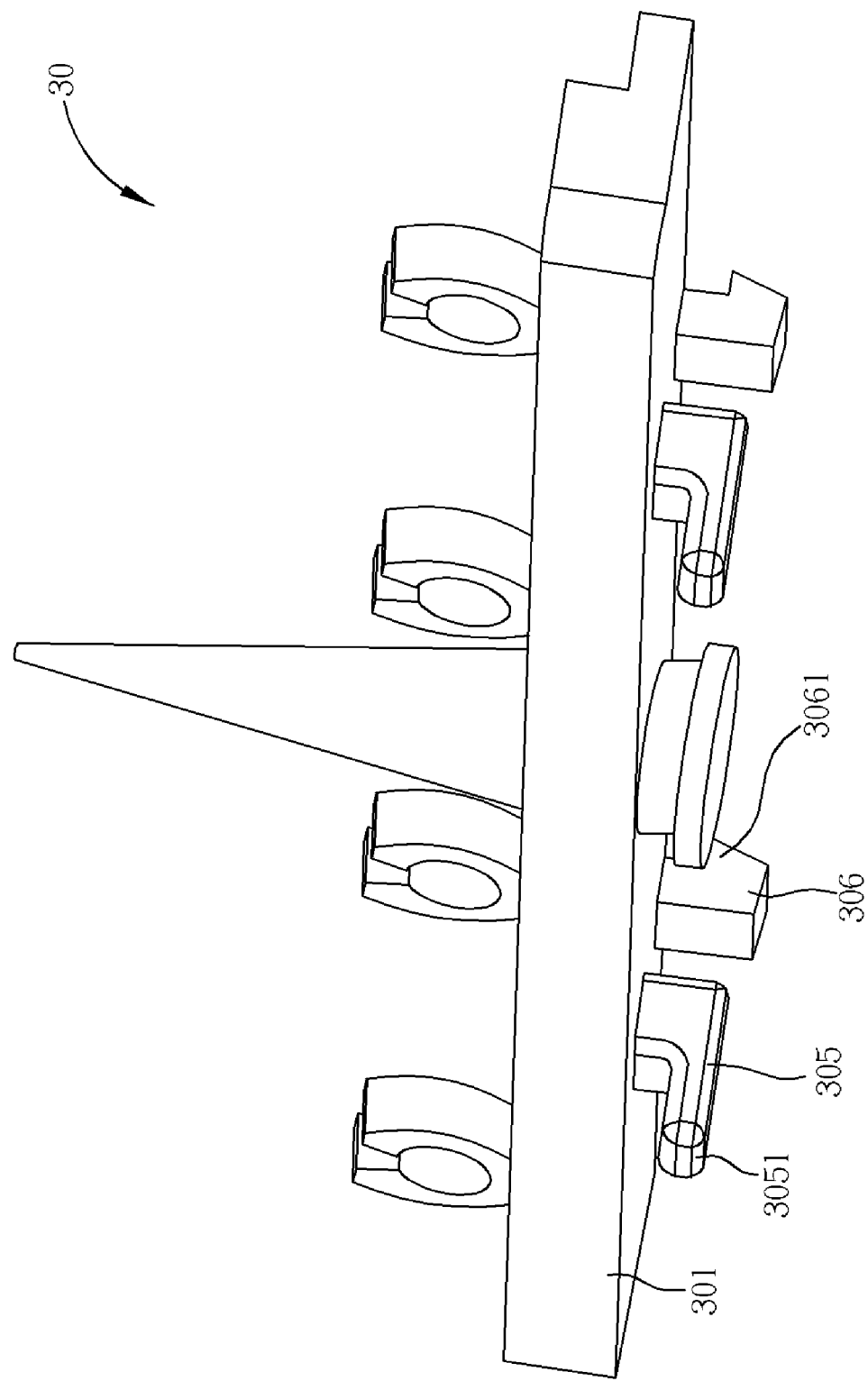
FIG. 15 is an illustration of a third exemplary embodiment of the fastening apparatus according to the present invention.
Figure 16:
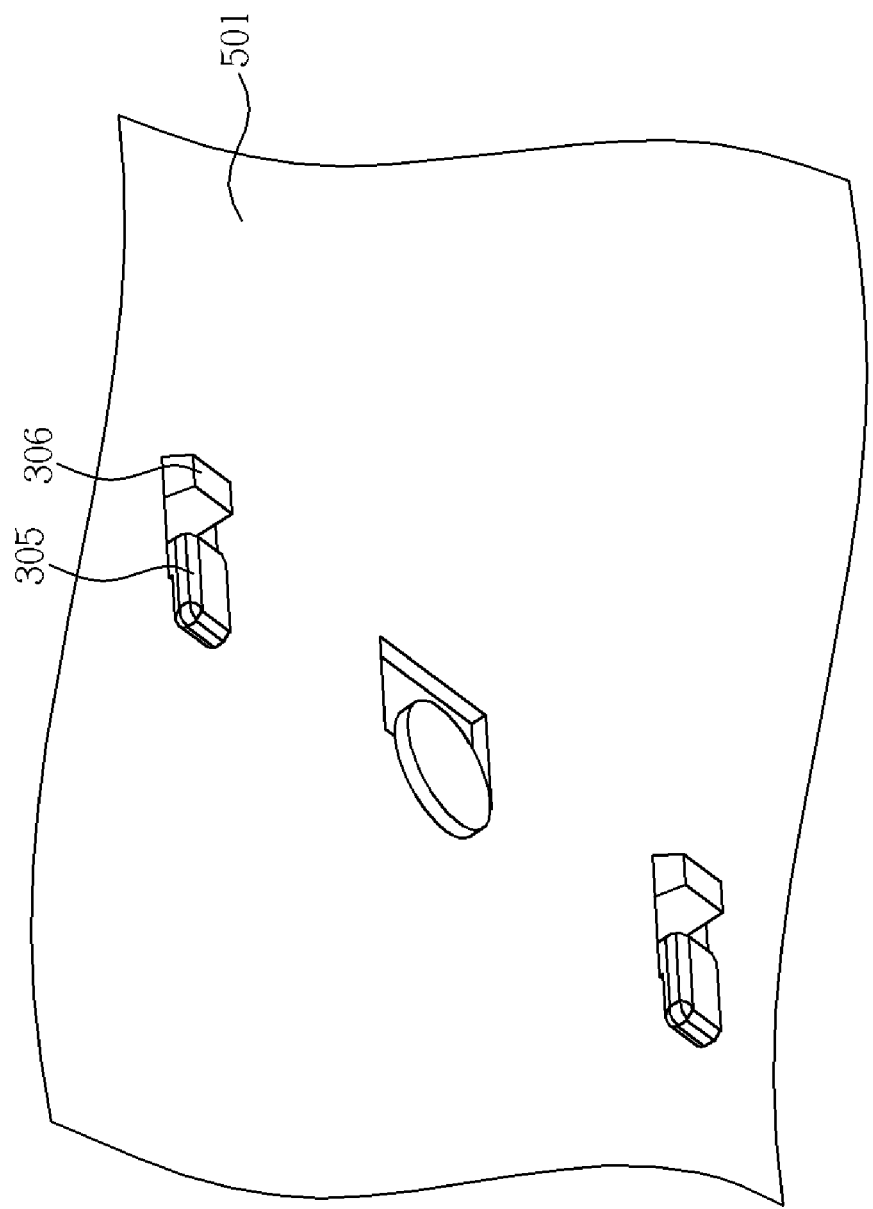
FIG. 16 is an illustration of a bottom perspective view of the fastening apparatus in FIG. 16 engaged into the back cover.

Please refer to FIG. 15 and FIG. 16. FIG. 15 is an illustration of a third exemplary embodiment of the present invention. Different to the first and the second exemplary embodiments aforementioned, the protrusion 3051 of the hanger 305 and the protrusion 3061 of the hook 306 extend parallel to the base 301 but perpendicular to the arrangement of the plurality of lamp holders 307 so that the fastening apparatus 30 is engaged in the back cover 501 with a traverse way compared with the first and second exemplary embodiments. FIG. 16 is an illustration of a bottom perspective view of the fastening apparatus 30 in FIG. 15 engaged into the back cover 501.

Figure 17:
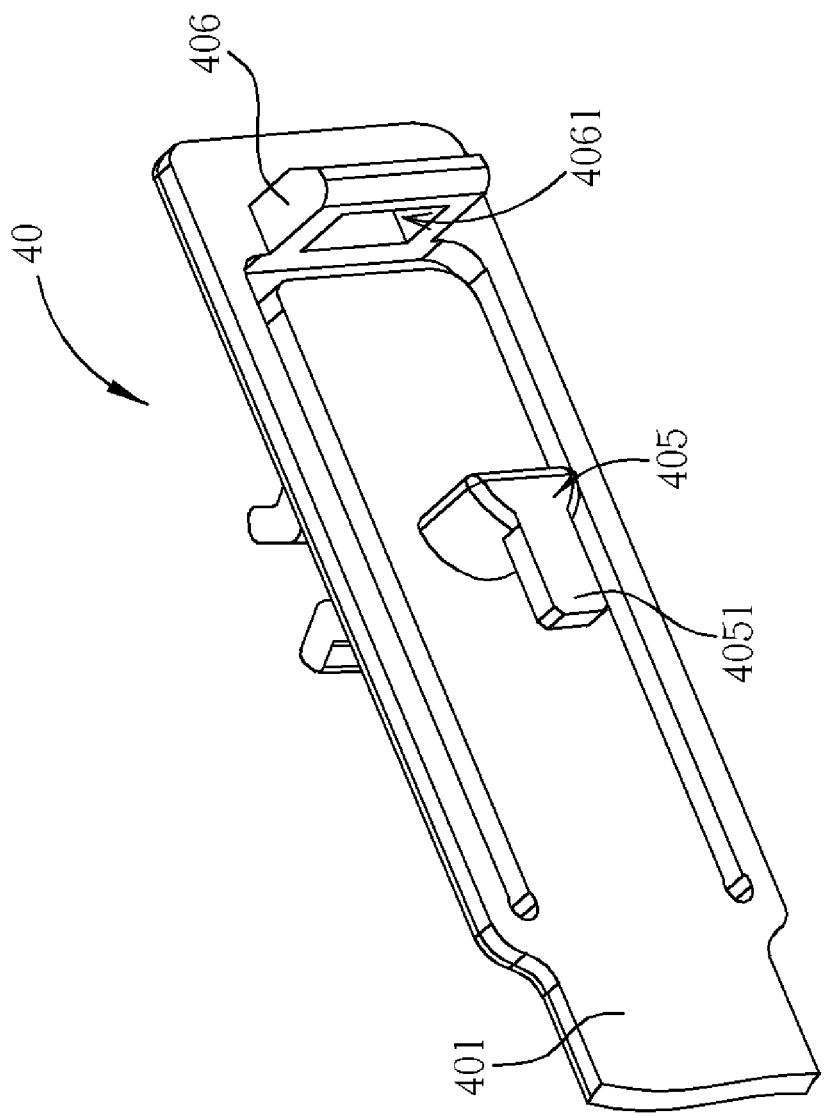
FIG. 17 is an illustration of a fourth exemplary embodiment of the fastening apparatus according to the present invention.
Figure 18:
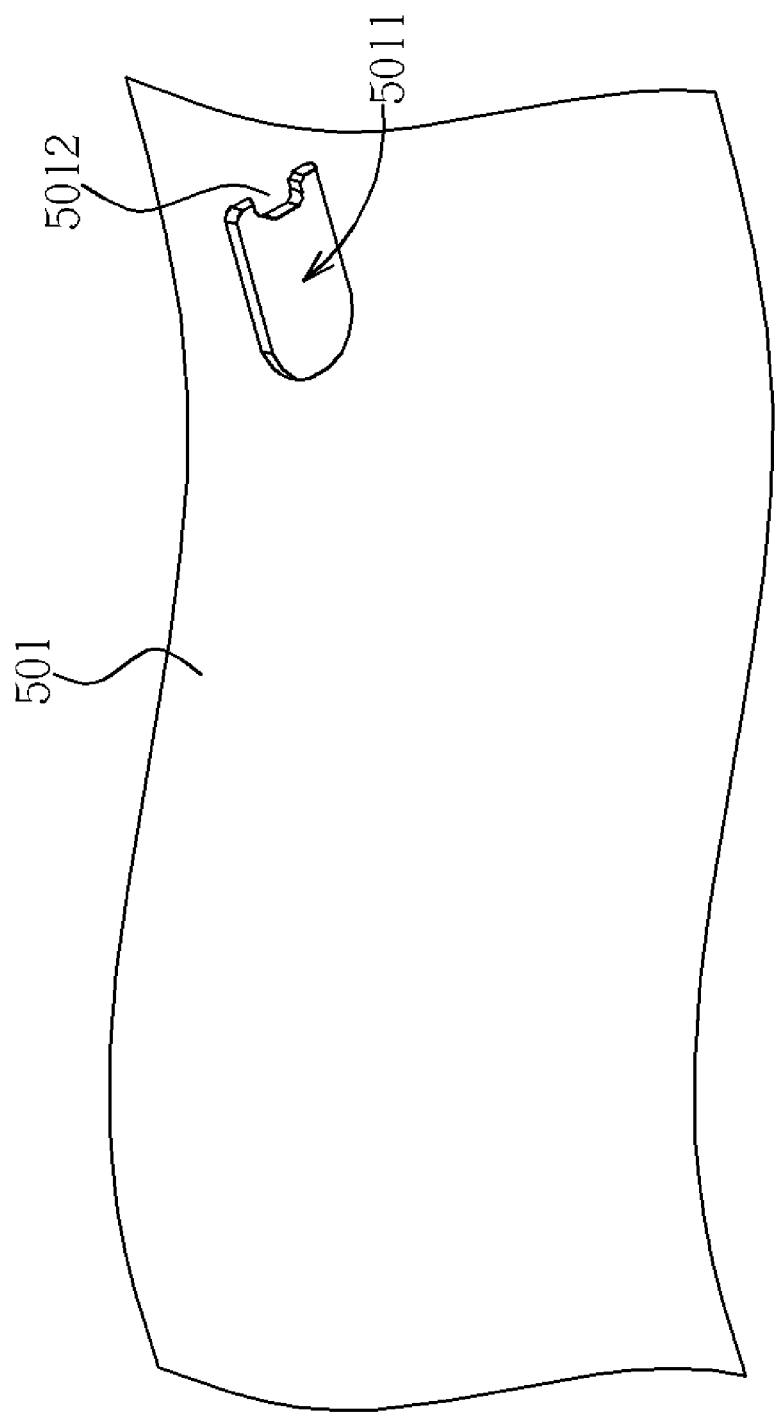
FIG. 18 is a partial illustration of the back cover adaptive to engage the fourth exemplary embodiment of the fastening apparatus.
Figure 19:
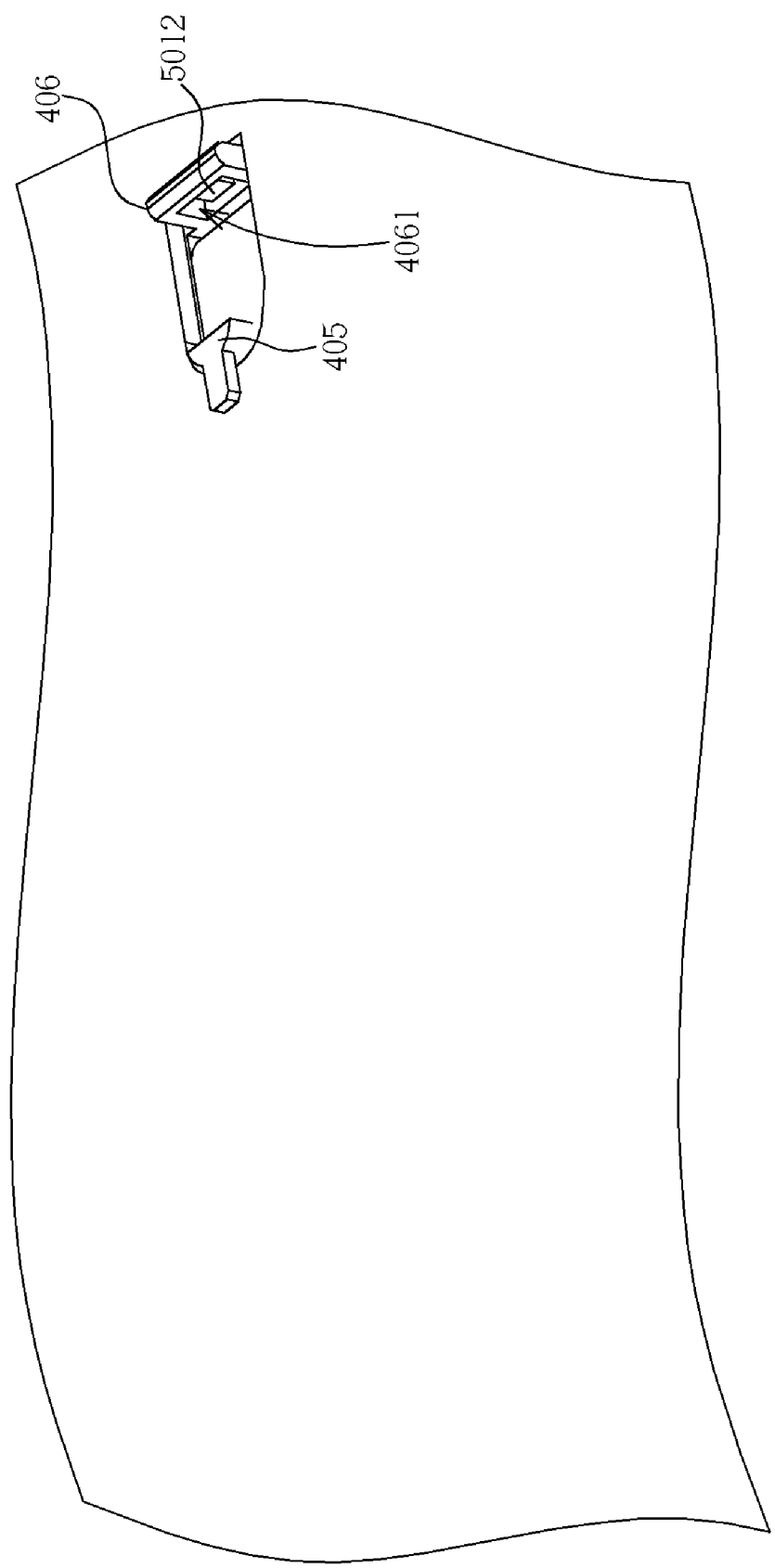
FIG. 19 is an illustration of a bottom perspective view of the fourth exemplary embodiment of fastening apparatus engaged into the back cover.

Please refer to FIG. 17 to FIG. 19. In a fourth exemplary embodiment of present invention, the hook 406 comprises an opening 4061 and the back cover 501 comprises an opening 5011 and a pin 5012 adaptive to engage the hook 406. The opening 4061 can be a hole or a slit. When the fastening apparatus 40 engages in the back cover 501, the hanger 405 hangs the fastening apparatus 40 on the back cover 501 and the hook 406 locks the fastening apparatus 40 by the pin 5012 engaging the opening 4061.

Figure 20:
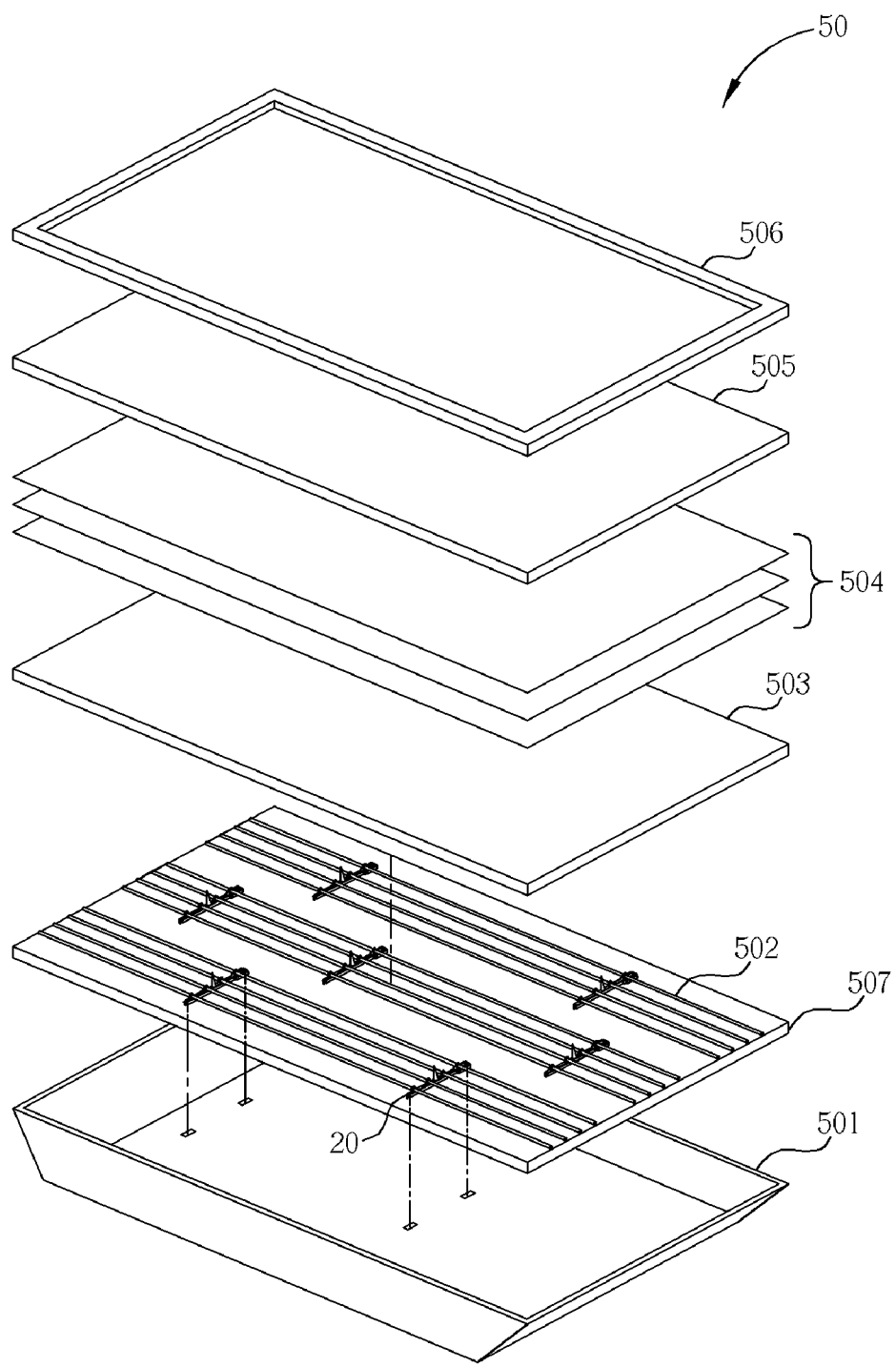
FIG. 20 is an illustration of a liquid crystal display device with a plurality of fastening apparatus for holding the lamps and sustaining the diffusing plate therein.

FIG. 20 collectively shows an illustration of an exemplary embodiment of a direct type LCD device 50 implementing the fastening apparatus 20 for holding the plurality of bar-like lamps 502 and sustaining the diffusing plate 503 disposed on the reflective sheet 507 and the fastening apparatus 20 and reflective sheet 507 disposed on the back cover 501 respectively, according to the present invention. The LCD device 50 comprises a back cover 501, a plurality of lamps 502, a plurality of fastening apparatus 20, a diffusing plate 503, a plurality of optical sheets 504, a display panel 505, and a top frame 506. The plurality of fastening apparatus 20 is engaged in the back cover 501 and holding the plurality of lamps 502 and sustaining the diffusing plate 503, which is disposed over the back cover 501 and the lamps 502. The lamps 502 are the light source that emits light uniformly while the light emitted to the reflective sheet 501 is reflected upward and the plurality of fastening apparatus 20 are used for fastening the lamps 502 and supporting the diffusing plate 503. The light reflected by the reflective sheet 501 is then transformed into an even uniform light source by the diffusing plate 503. The plurality of optical sheets 504 are disposed over the diffusing plate 503 and enhance the brightness or optical characteristics of the diffused light. The display panel 505 is disposed over the plurality of the optical sheets 504. The top frame 506 covers the display panel 505 so that the display panel 505 can be fixed to the backlight assembly (the back cover 501, the lamps 502, the diffusing plate 503, and the fastening apparatus 20) by the top frame 506.

The fastening apparatus and the LCD device implementing the fastening apparatus utilizes a hanger and a hook disposed on the first side of the base of the fastening apparatus for hanging and fixing the fastening apparatus on a back cover of the LCD device. A groove separates the base into two parts and the outer part of the base as well as the hook is flexible relative to the inner part of the base. Two crack arresters are disposed at the end of the groove for preventing cracking of the fastening apparatus when repeated bending movement is needed while installing the fastening apparatus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fastening apparatus for a backlight assembly, comprising:
    a base having a first side and a groove;
    a hanger disposed on the first side of the base; and
    a hook disposed on the first side of the base;
    wherein the groove divides the first side of the base into an inner part and an outer part and has at least a crack arrester.

2. The fastening apparatus of claim 1, wherein the hanger is disposed on the inner part of the base.

3. The fastening apparatus of claim 1, wherein the hook is disposed on the outer part of the base.

4. The fastening apparatus of claim 1, wherein the groove is U-shaped, M-shaped, or C-shaped.

5. The fastening apparatus of claim 1, wherein the groove is penetrative through the base.

6. The fastening apparatus of claim 1, wherein the crack arrester is disposed at the end of the groove.

7. The fastening apparatus of claim 1, wherein the crack arrester is circular, U-shaped, or rectangular.

8. The fastening apparatus of claim 1, wherein the hanger comprises a first protrusion and the hook comprises a second protrusion.

9. The fastening apparatus of claim 8, wherein the first protrusion of the hanger is extended parallel to the base.

10. The fastening apparatus of claim 8, wherein the second protrusion of the hook is extended parallel to the base.

11. The fastening apparatus of claim 10, wherein the extending direction of the first protrusion is opposing to that of the second protrusion.

12. The fastening apparatus of claim 8, wherein the length of the first protrusion is not smaller than that of the second protrusion.

13. The fastening apparatus of claim 1, wherein the hook comprises a hole.

14. The fastening apparatus of claim 1, wherein the hook comprises a slit.

15. The fastening apparatus of claim 1, wherein the base, hook and hanger are made of white or transparent polycarbonate (PC).

16. The fastening apparatus of claim 1, wherein the light reflection rate of the fastening apparatus is greater than 80%.

17. The fastening apparatus of claim 1, wherein the base, the hanger, and the hook are monolithically made.

18. A liquid crystal display (LCD) device, comprising:
    a back cover;
    a reflective sheet disposed on the back cover;
    a light source disposed on the reflective sheet;
    a diffusing plate disposed on the light source; and
    a fastening apparatus disposed between the back cover and the diffusing plate and engaged with the back cover, the fastening apparatus comprising:
        a base having a first side and a groove;
        a hanger disposed on the first side of the base; and
        a hook disposed on the first side of the base;
    wherein the groove divides the first side of the base into an inner part and an outer part and has at least a crack arrester.

* * * * *